Sept. 6, 1932.   R. BERINGER   1,875,696
CLUTCH
Filed Nov. 29, 1929   2 Sheets-Sheet 1

Inventor
Roscoe Beringer
By Blackmore, Spencer & Flick
Attorneys

Patented Sept. 6, 1932

1,875,696

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

CLUTCH

Application filed November 29, 1929. Serial No. 410,536.

This invention relates to clutches and has been designed more particularly as an improved clutch for motor vehicles.

An object of the invention is to secure better dissipation of heat, to better protect the clutch springs from heat and thereby avoid drawing their temper, and to make a clutch which is stronger and more easily balanced. Other objects and advantages will be understood from the following description.

Figure 1:
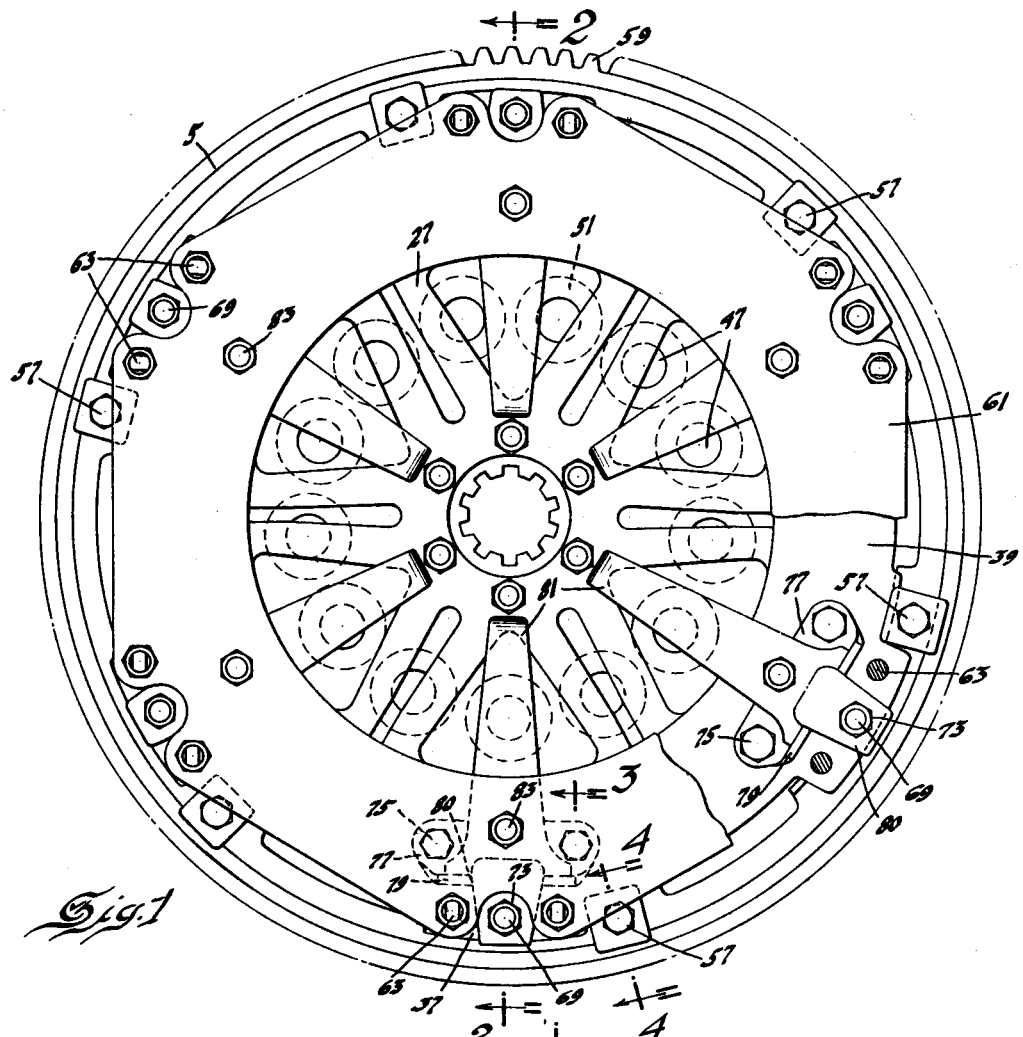
Figure 3:
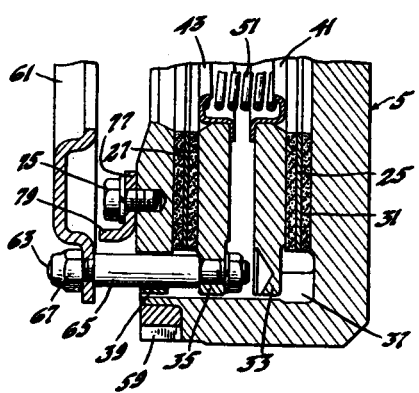
Figure 4:
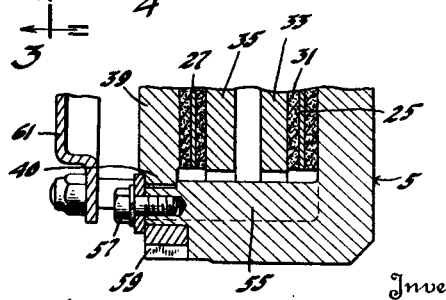
Figure 2:
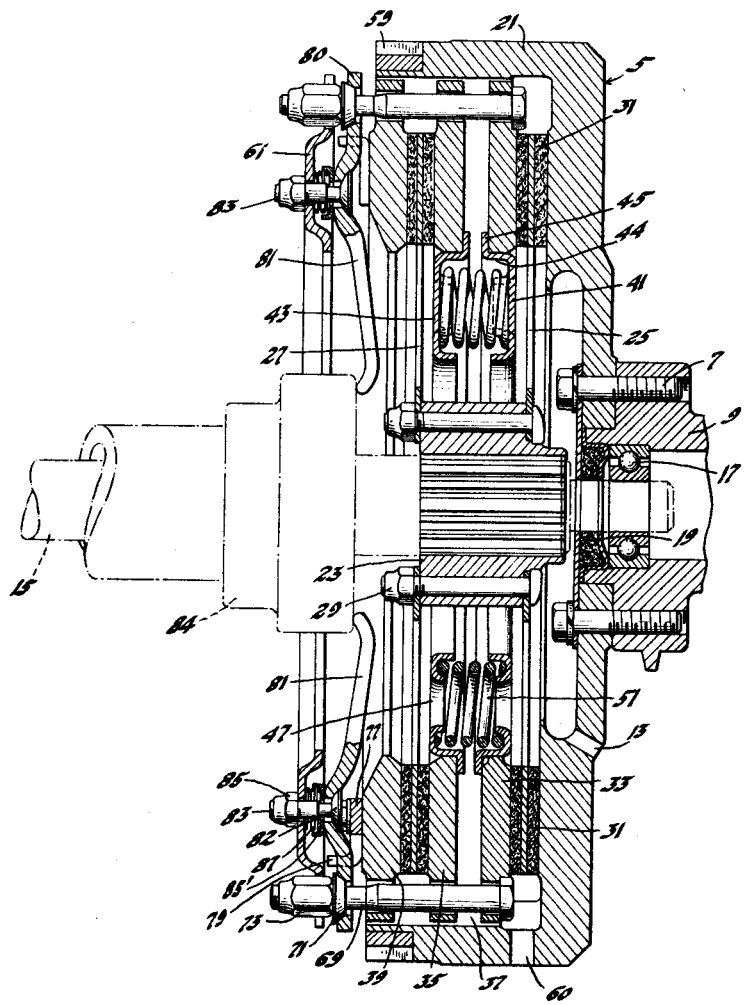

In the drawings accompanying this description, Figure 1 represents a rear elevation of the clutch with parts broken away. Figure 2 is a section on line 2—2 of Figure 1. Figure 3 is a section on line 3—3 of Figure 1. Figure 4 is a section on line 4—4 of Figure 1.

Referring to the several figures of the drawings by reference characters, numeral 5 represents the flywheel which is secured by fastening means 7 to the engine shaft 9. The flywheel may be provided with an oil drain 13. The driven shaft 15 may be piloted into an opening in the adjacent end of shaft 9, there being shown an antifriction bearing 17 and a retainer therefor with a packing as at 19.

The flywheel is formed with a flange 21 within which are housed the driving and driven elements of the clutch. On the driven shaft 15 is a splined hub 23 carrying driven clutch plates 25 and 27. These plates engage opposite end faces of the hub 23 and are held thereto by fastening means 29. At the outer periphery of the driven plates 25 and 27 and on both sides of each, there are provided suitable friction rings 31. Annular plates represented on the drawings by numerals 33 and 35 are driving plates and are slidable in the keyways 37 formed in the flywheel flange. These plates 33 and 35 move away from each other to grip the driven plates.

Plate 33 moves toward the face of the flywheel to grip the plate 25 between itself and the flywheel face. The plate 35 moves in the opposite direction to grip the driven member 27 between itself and a driving plate 39, the latter secured to the flywheel flange as hereinafter described. Annular rings 41 and 43 are positioned radially within the driving plates 33 and 35. They have axially directed flanges 44 from which extend radial flanges 45 engaging the adjacent faces of the driving plates 33 and 35 as shown in Figure 2. These annular rings have a plurality of inwardly directed circumferentially shaped portions 47 extending toward each other to center a plurality of springs 51. These springs 51 operate to spread apart the rings 41 and 43 and thereby cause the driving plates 33 and 35 to move away from each other and clutch the driven plates 25 and 27 between themselves and the flywheel on one side and the fixed driving plate 39 on the other side.

At a plurality of positions around the flywheel, the flange is inwardly extended as at 55 (see Figure 4) where it engages outwardly extended parts 40 of plate 39, suitable fastening means being provided to secure the parts in position. These fastening means comprise a stud 57 with a suitable washer and lock nut as shown. As is customary, the flywheel is provided with a starter gear ring 59. A plurality of openings, one of which is shown by numeral 60 on Figure 2, may be provided to aid in cooling the driving parts of the clutch.

At 61 is a pressure plate of substantially annular form. At its outer periphery it is connected by a plurality of spaced pairs of bolts 63 with the adjacent axially movable driving plate 35. This construction is best shown in Figure 3. These bolts carry integral or separable spacers 65 and nuts 67 whereby movement of plate 61 is communicated to driving plate 35. Between the bolts 63 of each pair there extends a bolt 69, its head being on the flywheel side of driving plate 33. This bolt carries adjacent its outer end a spherically surfaced member 71 held in position by a suitable nut 73. Secured by fastening means 75 to the outer driving plate 39, are a plurality of plates 77 each having a pair of spaced axial flanges 79. Each plate 77 supports a radial lever or finger 81. The outer ends of the fingers extend between the flanges 79. Radially within the flanges 79 each finger 81 is provided with lateral extensions 80 as shown in Figure 1 to contact flanges 79. It will be understood that as usual the inner ends of the fingers are engaged by a suitable throw-out member 84 actuated by any preferred mechanism. This mechanism, constituting no part of the present invention, is not illustrated. The radial fingers at a position between the fastening means 75 of plate 77 are arched and their outer ends extend between the axial lugs 79. This arched portion engages a spherically surfaced head 82 on a fulcrum pin 83 held by a nut 85 on the pressure plate 61. Surrounding the pin 83 within the pressure plate is a suitable cup 85' and a spring 87 engages the cup as one abutment and the plate 61 as another abutment, the cup 85' engaging the finger as best shown in Figure 2. As will be seen, the fulcrum of each finger is substantially midway between the points of connection of the lever with the bolt 69 and the pin 83. When the ends of the levers or fingers are moved toward the flywheel, the levers fulcrum about their points of contact with plate 77, draw the plates 33 and 35 toward each other, and release the clutch. It is preferred to use six of these clutch releasing fingers and thereby better distribute the forces of the clutch releasing operation.

The operation of the clutch is obvious from the description, but will be briefly set forth. When the pedal or other operating member is released, the springs 51, of which I prefer to use a rather large number to insure equal action all around the clutch (13 being shown), spread the driving plates 33 and 35 apart and clamp the driven plates between themselves and the flywheel on one side and the fixed driving plate 39 on the other side. When the inner ends of the fingers are pushed toward the flywheel, the outer ends operate to draw the plates 33 and 35 together. This operation is effected in the one case by the series of bolts 69 and in the other case by the pressure plate 61 and the connecting bolts 63. It should be noted that the fingers are fulcrumed on the plate 77 carried by the outer driving plate 39, and are so interconnected with the plate 77 that the centrifugal force is resisted and does not affect the pressure plate 61. Should it be desired to facilitate avoidance of heat still farther, the inner peripheries of the driving members 33 and 35 may be reduced at the point where they contact the ring members 41 and 43. To show this construction, the ring member 33 has been so illustrated.

Heat dissipation by the novel clutch structure is greatly facilitated. The flywheel acts as one of the driving plates and because of its mass and its provision of ventilation, is effective in carrying away the heat derived from friction. Each of the movable driving plates has one full surface swept by air. The keying of the sliding driving plates makes the danger of seizing with heat distortion less than when such plates are guided on pins as in some of the earlier forms of clutches. As a result of the securing of the rear plate 39 to the flywheel, the entire assembly is fixed in relation to the flywheel. The pressure plate is connected to the adjacent one of the sliding plates by a bolt which need not be of great length. In a similar prior construction long bolts were used to hold the pressure plate; as a result there was some tendency to destroy the parallelism between the pressure plate and the flywheel face which is now avoided. In view of the short length of these bolts, it is an easy matter to hold the pressure plate assembly concentric with the clutch and to insure a better balance. The operating levers or fingers are carried by the rear plate 39. This avoids the loss of balance which might occur were its fingers supported on the pressure plate since under such circumstances the supporting studs or bolts carry the load. The springs 51 are but little exposed to heat conduction from the operating plates. These are a few of the advantages which are apparent in the structure of the novel clutch.

I claim:

1. In a disc clutch, parallel spaced driven plates, a plurality of pairs of driving plates, the plates of each pair being one on either side of a driven plate, the inner and adjacent driving plates being axially slidable, yielding means to separate said inner driving plates, a plurality of radially disposed operating pivoted fingers, means connecting each of said fingers on the opposite sides of its fulcrum to the movable driving plates.

2. The invention defined in claim 1, the connection with the adjacent movable driving plate comprising a pressure ring, tension connections between said ring and each finger and a plurality of compression connections between said pressure ring and the adjacent movable driving plate.

3. In a disc clutch, a pair of spaced driving plates, means to connect said plates to prevent relative motion axially and circumferentially, a second pair of spaced driving plates between the plates of the first pair, means to mount the plates of the second pair for movement axially relatively to each other and to the plates of the first pair but to prevent relative rotary movement relative to the plates of the first pair, a driven shaft, a pair of driven plates secured thereto, each of said driven plates being positioned between one of the plates of the first pair of driving plates and one of the plates of the second pair of driving plates, resilient means terminally operable upon the adjacent faces of the axially movable driving plates and at all times tending to grip the driven plates between the driving plates, and mechanically operated means to overcome said resilient means and release the clutch.

4. In a disc clutch, parallel and spaced driven plates, a plurality of pairs of parallel and spaced inner and outer driving plates, the inner plate of each last-named pair being movable axially relative to the other plate of its pair to clamp a driven plate between itself and the other driving plate, the movable driving plates moving away from each other in gripping the driven plates, yielding means between the inner driving plates and constantly pressing said plates toward the outer driving plates, a plurality of levers, connections between said levers and said inner driving plates, and common means to rock said levers to compress the yielding means and move the inner driving plates toward each other to release the grip on the driven plates.

5. In a clutch, a plurality of driving members fixed from axial movement, a second plurality of axially movable annular driving members spaced from each other and positioned between the first-named driving members, the fixed and movable driving members constituting two pairs of relatively axially movable driving members, a driven member positioned between the driving members of each pair, together with annular rings externally engaging by their outer circumferential portions the inner circumferential portions of the annular axially movable driving members, spring means between said annular rings to effect clutch engagement, and mechanical means operable upon the inner axially movable driving members to overcome said spring means and effect clutch release.

6. In a disc clutch, a pair of spaced driving plates, means to connect said plates to prevent relative motion axially and circumferentially, a second pair of spaced driving plates between the plates of the first pair, means to mount the plates of the second pair for movement axially relatively to the plates of the first pair but to prevent relative rotary movement, a pair of driven plates, each of said driven plates being positioned between one of the plates of the first pair of driving plates and one of the plates of the second pair of driving plates, means to simultaneously grip the driven plates between the driving plates and other means to release the driven plates, said last named means comprising a pressure plate, means securing said pressure plate to the adjacent movable driving plate, a releasing lever, means connecting said lever at one point thereon to said pressure plate and means connecting said lever at another point thereon to said remote driving plate.

7. In a disc clutch, parallel spaced driven plates, a driven shaft secured to said plates, a plurality of pairs of driving plates, the plates of each pair being one on either side of a driven plate, the inner and adjacent driving plates being axially slidable together with annular rings, their outer peripheries engaging the inner peripheral portions of the adjacent movable driving plates and a plurality of springs between said annular rings to cause equalized gripping action on said driven plates.

8. In a disc clutch, parallel spaced driven plates, a driven shaft secured to said plates, a plurality of pairs of driving plates, the plates of each pair being one on either side of a driven plate, the inner and adjacent driving plates being axially slidable together with annular rings, their outer peripheries engaging the inner peripheral portions of the adjacent movable driving plates and a plurality of springs between said annular rings to cause equalized gripping action on said driven plates, the adjacent driving plates being spaced whereby air currents may traverse the springs and the adjacent faces of the movable driving plates.

9. In a clutch, a plurality of driving members fixed from axial movement, a second plurality of axially movable annular driving members spaced from each other and positioned between the first named driving members, the fixed and movable clutch driving members constituting two pairs of relatively axially movable driving members, a driven member positioned between the driving members of each pair together with annular rings externally engaging the inner periphery of the axially movable driving members, yielding means between said annular rings to effect clutch engagement, and means to overcome said yielding means to effect clutch release, said last named means comprising a pressure ring axially beyond one fixed driving member, a plurality of radial fingers fulcrumed on said least named fixed driving member, connections between said fingers and said pressure plate, together with connections between said pressure plate and the adjacent movable driving member and connections between said fingers and the remote slidable driving member.

In testimony whereof I affix my signature.

ROSCOE BERINGER.